(12) United States Patent
Paleiov et al.

(10) Patent No.: US 6,275,142 B1
(45) Date of Patent: Aug. 14, 2001

(54) INTERACTIVE ENHANCEMENT FOR PRINTED BOOKS

(75) Inventors: Ilan Paleiov, Kfar Vradim; Benjamin Cohen, Mitzpeh Gilon, both of (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/153,203

(22) Filed: Sep. 15, 1998

(51) Int. Cl.[7] .................................................. H04Q 5/22
(52) U.S. Cl. ............... 340/10.1; 340/10.42; 340/825.49; 345/156; 704/7
(58) Field of Search .............................. 340/10.1, 10.42, 340/825.49; 345/156, 192, 348; 704/1, 7

(56) References Cited

U.S. PATENT DOCUMENTS

| | | | |
|---|---|---|---|
| 4,453,161 | * | 6/1984 | Lemelson ........................ 340/825.31 |
| 4,985,697 | * | 1/1991 | Boulton ............................... 345/192 |
| 5,450,070 | * | 9/1995 | Massar et al. .................... 340/10.42 |
| 5,517,407 | * | 5/1996 | Weiner ..................................... 704/1 |
| 5,587,724 | * | 12/1996 | Matsuda .............................. 345/156 |
| 5,640,552 | | 6/1997 | Yianilos . |
| 5,804,803 | | 9/1998 | Cargun et al. . |

* cited by examiner

*Primary Examiner*—Brian Zimmerman
*Assistant Examiner*—Yves DaLencourt
(74) *Attorney, Agent, or Firm*—Darby & Darby

(57) ABSTRACT

A device for storing data relating to a printed work, including an electronic memory, fixed to the printed work, containing at least a portion of the information in the printed work. The device additionally includes a communications port, coupled to the memory, through which a computer external to the printed work accesses the information stored in the memory.

34 Claims, 2 Drawing Sheets

INTERACTIVE ENHANCEMENT FOR PRINTED BOOKS

FIELD OF THE INVENTION

The present invention relates generally to interactive data access, and specifically to methods and devices to access data from printed books.

BACKGROUND OF THE INVENTION

Printed books and journals continue to be popular consumer items and research tools, despite their relative inefficiency as a means for locating data. Electronic tools that permit scanning a hard drive or the World Wide Web for a single keyword or complex Boolean search request cannot, due to the nature of the medium, determine if the desired text is present in a printed book. Even the index of a printed book does not enable a reader to efficiently perform a simple multi-term search, unless the person who prepared the index had closely anticipated the reader's particular search. Performing a search in multiple printed books, for instance twenty books of similar subject matter grouped together on a library shelf, is a time-consuming task using the tools of the current art. Nevertheless, books and journals printed on paper are in broad use for many reasons unrelated to ease of data access, including consumers' preferences for reading from printed books and the publishing industry's recognition of the greater likelihood of public adherence to copyright laws if the medium is printed rather than electronic.

Various methods and devices are known in the art for text searching of electronically stored media. For example, U.S. Pat. No. 5,640,552 to Yianilos, whose disclosure is incorporated herein by reference, describes a device which provides text recovery from electronically stored text. There are no known devices, however, that enable rapid, efficient searching of text in a printed medium.

SUMMARY OF THE INVENTION

It is an object of some aspects of the present invention to provide devices and methods to enable electronic data searching in printed material.

In preferred embodiments of the present invention, an electronic device is coupled to a cover or spine of a book and includes a non-volatile memory, preferably including ROM, in which at least a portion of the text and/or other contents of the book is stored. The device also includes an interface through which a user may communicate with the device, preferably using a computer external to the book and in wireless communication with the device. The user interacts with the device to search the text of the book or, alternatively or additionally, to insert bookmarks and annotations in a read/write portion of the memory. The device preferably includes a processor able to search through the text stored in the memory in order to find locations of a desired word or phrase or to perform a logical search of any type known in the art.

In some preferred embodiments of the present invention, a plurality of books equipped with respective electronic devices as described hereinabove can be searched substantially simultaneously, and the results reported to the external computer. The devices may thus be used to generate a table containing titles, bibliographic information, and appropriate reference locations in books that generate a positive search result. Preferably, the external computer can download desired text and/or graphic images from the electronic devices in the books, and store these data, along with the corresponding bibliographic information, for later use.

In some preferred embodiments of the present invention, the electronic device contains data that are related to the content of the printed book that are not printed therein. For example, the device may include an author profile, printing history, video, audio, graphic images, hyper-links, software, nucleotide listings, and other materials that for various reasons are not appropriate to a printed medium.

In preferred embodiments of the present invention, the external computer comprises a Personal Digital Assistant (PDA), a general purpose desktop or portable computer, or a dedicated computer. The external computer preferably communicates with the electronic device attached to the book using methods of wireless communications, such as infrared (IR) or radio frequency (RF) technology. Most preferably, the communication makes use of a standard IR communications interface, such as IRDA (Infrared Data Association), which is widely available in PDAs and personal computers. Alternatively, any other suitable wireless or wired interface or protocol may be used.

In some preferred embodiments of the present invention, one or more relay units are distributed in a library or other collection of books. Each relay unit has a communications interface, preferably an IR interface, enabling it to exchange data with the external computer, with the electronic devices coupled to the books, and, preferably, with one or more other relay units. In one preferred mode of operation, the user enters a query in the external computer, and the query is transmitted by IR to a nearby relay unit. This unit subsequently relays the query to other relay units in the library, which transmit the query by IR to the electronic devices within the respective range of each of the relay units. Answers to the query, for example comprising text, bibliographic information, or the locations of relevant books within the library, are subsequently generated within each of the electronic devices. Positive responses are transmitted by IR back to the respective relay units, from which they are passed to the relay unit located near the user, in order to be transmitted by IR to the external computer. Alternatively, the user is not physically present in the library, but rather establishes a remote link with a computer within the library, which is connected to the relay units and coordinates processing of the user's query.

In some preferred embodiments of the present invention, the electronic device includes one or more signaling units, for instance light emitting diodes (LEDs) or sound-producing elements, able to provide sensible signals and thereby to convey information to the user. In this manner, the user may distinguish, for example, which of many books in a bookshelf contains a text string of interest.

In some preferred embodiments of the present invention, the electronic device is powered by a replaceable or rechargeable battery located therein. Additionally or alternatively, the device may receive power from an external source, for example, by inductive coupling from a coil in a vicinity of the book, which coil may be on or in the bookshelf or coupled to the external computer. Further additionally or alternatively, the device may receive power using a photoelectric cell or through a cable.

In some modes of operation, for example during use of the electronic device in a library, the processor preferably is programmed to detect a low-battery state and to subsequently transmit to a centrally located computer an IR or RF "request for attention," accompanied by truncated bibliographic information about the book to which it is coupled, in order to enable library personnel to maintain all electronic devices fully operational.

There is therefore provided, in accordance with a preferred embodiment of the present invention, a device for storing data relating to a printed work containing information, including:

an electronic memory, fixed to the printed work, in which at least a portion of the information in the printed work is stored; and a communications port coupled to the memory, through which a computer external to the printed work accesses the information stored in the memory.

Preferably, the memory is fixed to a binding of the printed work.

In a preferred embodiment, the memory includes a read-only memory.

In another preferred embodiment, the memory includes a read-write memory, to which the external computer writes data via the communications port. Preferably, the data written by the external computer include a bookmark referring to a location in the memory specified by a user of the computer.

Preferably, the device includes a processor, which interacts with the memory in response to a command received via the communications port.

Further preferably, the processor searches the memory in accordance with instructions specified by a user of the external computer.

Still further preferably, the processor transmits a selected portion of the information in the memory to the external computer via the communications port.

Additionally or alternatively, the device includes an indicator coupled to the processor, which provides a sensible signal to a user of the external computer.

In a preferred embodiment, the indicator includes a light-emitting element.

Preferably, the communications port includes a wireless communications link. In a preferred embodiment, the wireless communications link includes an infrared communication element mounted on a spine of the printed work. Preferably, the infrared communication element includes an infrared transmitter and receiver, which communicate with a corresponding receiver and transmitter associated with the external computer.

Preferably, the external computer communicates with the communications port substantially simultaneously with communicating with similar communications ports on other printed works.

Further preferably, the device includes a battery fixed to the printed work, which provides power to operate the device. In a preferred embodiment, the device detects a low-battery state of the battery and generates a low-battery signal responsive to the low-battery state. Preferably, the low-battery signal includes a wireless transmission through the communications port to a receiving unit external to the printed work.

In a preferred embodiment, the device includes a photoelectric cell fixed to the printed work, which provides power to operate the device.

In another preferred embodiment, the device includes an inductive element fixed to the printed work, which receives electromagnetic energy from a transmitter external to the printed work and converts the energy to an electrical current to operate the device.

There is further provided, in accordance with a preferred embodiment of the present invention, apparatus for storing and retrieving data relating to a printed work containing information, including:

an electronic memory, fixed to the printed work, in which at least a portion of the information in the printed work is stored; and a computer external to the printed work, which accesses the information stored in the memory.

Preferably, the apparatus includes a relay unit in communication with the external computer, wherein an instruction from the external computer is received by the relay unit and is relayed therefrom to a communications port associated with the electronic memory so as to access the information stored therein.

There is also provided, in accordance with a preferred embodiment of the present invention, a method for electronically accessing information contained in a printed work, including:

storing at least a portion of the information in an electronic memory device;

fixing the device to the printed work; and accessing the information stored in the memory device.

Preferably, storing the information includes storing text information.

In a preferred embodiment, the method includes storing in the memory device non-textual data relating to the information in the printed work.

Additionally or alternatively, the method includes storing in the memory device bibliographic information relating to the printed work.

Preferably, accessing the information includes communicating with the device over a wireless link. In a preferred embodiment, communicating with the device includes sending and receiving infrared signals.

In another preferred embodiment, the method includes generating a low-battery signal responsive to detecting a low-battery state of a battery coupled to the device, and transmitting the low-battery signal over a wireless link to a receiving device.

Preferably, accessing the information includes communicating substantially simultaneously with multiple electronic memory devices fixed to multiple, respective printed works.

Further preferably, accessing the information includes searching the memory device for a specified data string and signaling a user when the specified data string is found. In a preferred embodiment, signaling the user includes actuating a sensible indicator on a cover of the printed work.

Additionally or alternatively, accessing the information includes writing data to the electronic memory device. In a preferred embodiment, writing the data includes recording a bookmark referring to a location in the memory device specified by a user of the computer.

There is additionally provided, in accordance with a preferred embodiment of the present invention, a method for electronically accessing information regarding a printed work to which an electronic device is fixed, the device including a memory in which the information is stored and a communications port coupled to the memory, the method including sending an instruction to the communications port and receiving a response from the port regarding the printed work based on the information in the memory. Preferably, sending the instruction includes initiating a search of the memory for a specified data string. Further preferably, receiving the response includes receiving a signal when the specified data string is found.

The present invention will be more fully understood from the following detailed description of the preferred embodiments thereof, taken together with the drawings, in which:

DETAILED DESCRIPTION OF PREFERRED EMBODIMENTS

Figure 1:
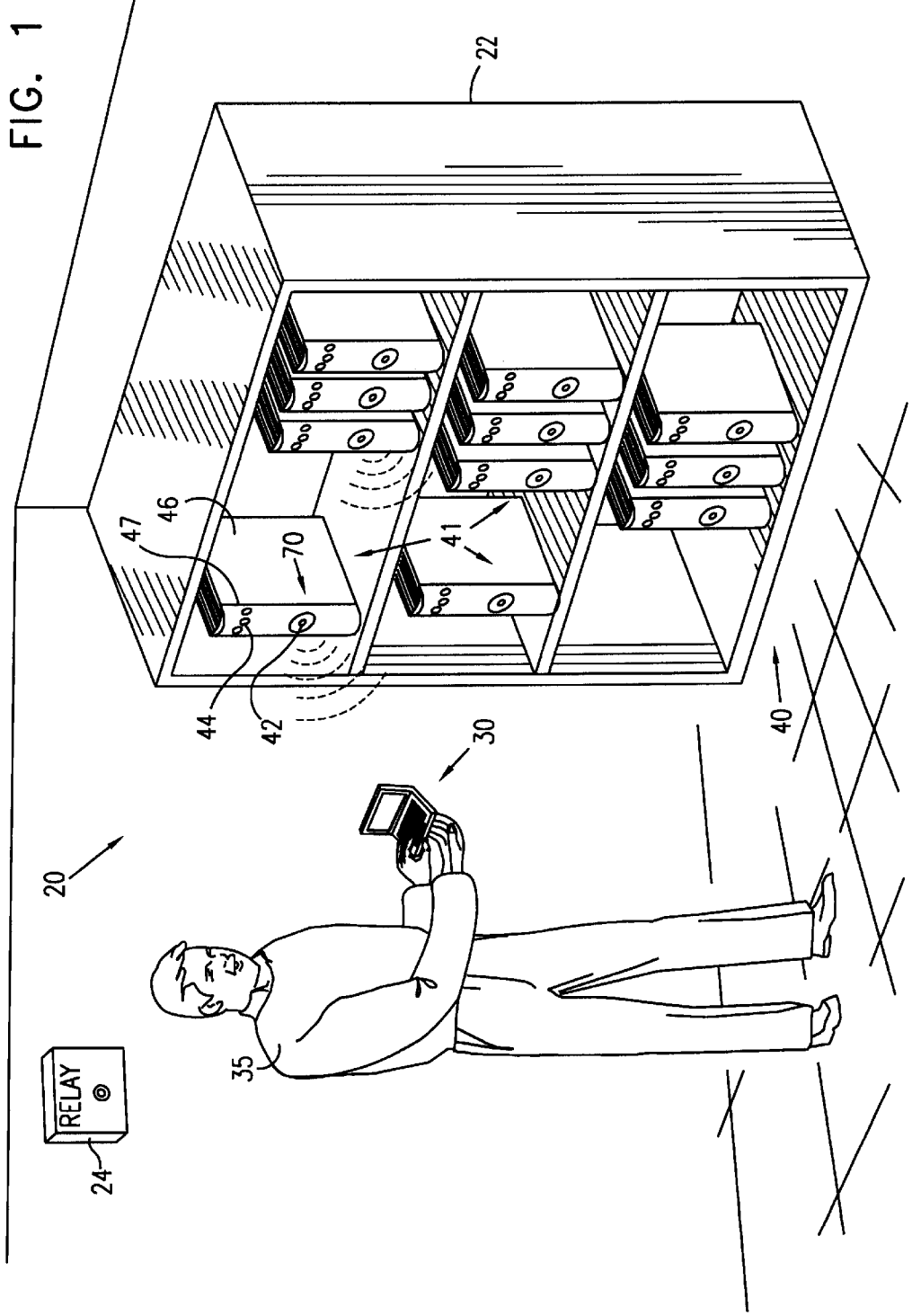
FIG. 1 is a schematic illustration of a system for electronic storage and transfer of data, in accordance with a preferred embodiment of the present invention.

FIG. 1 is a schematic illustration of a system 20 for storage, search and transfer of data in interactive books 41, using an external computer 30, in accordance with a preferred embodiment of the present invention. Each interactive book 41 comprises an electronic device 70 coupled to a standard printed book 46. External computer 30 preferably comprises a hand-held computer as is known in the art, such as a PDA with infrared data transfer capabilities. Alternatively, external computer 30 comprises any suitable type of portable or desktop computer, which may be used for general computing and/or word processing or may be substantially dedicated to system 20, and which employs IR and/or RF signaling to interface with interactive book 41.

Figure 2:
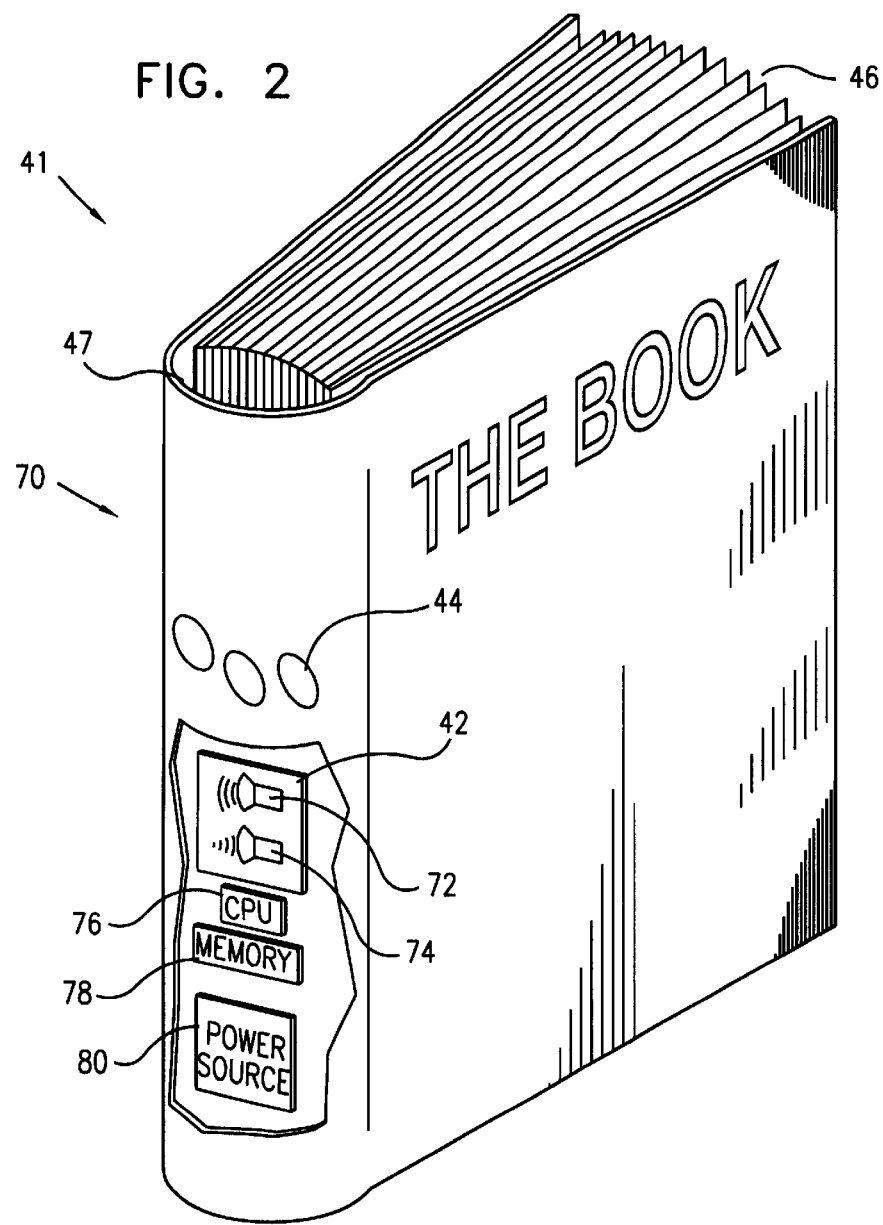
FIG. 2 is a schematic illustration of a device for storing and transferring data in the system of FIG. 1, in accordance with a preferred embodiment of the present invention.

FIG. 2 is a schematic illustration showing details of electronic device 70, in accordance with a preferred embodiment of the present invention. The electronic device is preferably fixed inside a binding 47 of each book 41, most preferably in the book spine as shown in FIG. 2, so as to be easily accessible when the books are placed in a bookshelf 22. Alternatively, the device may be fixed elsewhere to or inside the book.

Device 70 comprises a memory unit 78, preferably comprising a ROM chip, in which the contents of the book are stored, along with other data relating to the book and of possible interest to a user 35 thereof. Alternatively or additionally, memory 78 may comprise flash memory, EEPROM (electronically-erasable programmable read-only memory), NVRAM (non-volatile random-access memory), or other non-volatile read/write memory, and at least a portion of the memory may be available for recording of bookmarks and annotations entered by user 35. The other data stored in memory 78 may include an author profile, printing history, bibliographic information, text, page numbers, tables, graphic images, computer program code, video, audio, graphic images, hyper-links, nucleotide listings, or any other information suitable for storage in the memory. The text of book 46 is preferably stored in compressed ASCII, Wide-character-format, or other formats as are known in the art.

Device 70 further comprises processing and communication elements, preferably including indicators 44, a communications port 42, a processor 76 and a power source 80. Port 42 comprises a wireless transmitter 72 and a wireless receiver 74, preferably contained together in one integrated unit. Communications port 42 receives instructions and queries from external computer 30 and transmits data responsive thereto. Preferably, transmitter 72 and receiver 74 respectively comprise an IR transmitter, such as a LED, and an IR receiver, such as a photocell, as are known in the art. Port 42 in this case operates in accordance with a standard IR communications interface protocol, most preferably IRDA, which is widely available in PDAs and personal computers.

Alternatively, any other suitable wireless or wired interface or protocol may be used. For example, transmitter 72 and receiver 74 may comprise RF transceiver circuitry, coupled to a suitable antenna (not shown in the figures) contained in binding 47.

Preferably, communications port 42 and external computer 30 are additionally enabled to exchange data with an optional wall-mounted relay unit 24 (FIG. 1). In a typical operational mode in, for example, a library, a plurality of relay units 24 are distributed throughout the library, in wired and/or wireless communication with each other. User 35 enters a query into external computer 30, which transmits the query to a nearby relay unit. This unit subsequently relays the query to books 41 and/or to some or all of the other relay units 24 in the library, which, responsive thereto, transmit the query to interactive books 41 within range of each of the respective relay units 24 throughout the library. Responses to the query are transmitted by the interactive books to the respective relay units and relayed therefrom to the relay unit near user 35. In this manner, a substantial portion of the books in a library can be searched, and results, preferably comprising bibliographic information and/or the location within the library of books generating a positive response, can be reported to the user. Additionally or alternatively, relay units 24 may be configured to receive queries entered by a remote user using, for example, a desktop computer in his home to connect to the library's set of relay units.

Processor 76 preferably comprises a low-power microchip CPU, which is maintained in a dormant, very low-power state until enabled by user 35, preferably by a suitable command transmitted from computer 30 to port 42. Once enabled, the CPU will wait for input from the user, process a request, transmit results, and return at a later time to the dormant power-saving state.

In order to access data stored in memory 78, user 35 enters queries or other instructions via external computer 30. Such queries and instructions may be of any suitable type known in the art. Preferably, the user enters standard text search queries, for example, "dog AND (cat OR kitten) AND PROXIMITY(35) veterinarian," and sees the results of the search on a screen of external computer 30. The display of results preferably comprises a list of which books among a set 40 (FIG. 1) of interactive books 41 produced a positive response.

In addition, indicators 44 preferably alert user 35 to the status and/or results of the search in each of books 41. Preferably, indicators 44 comprise one or more LEDs, which are visible on the spine of each book 41 in set 40. For example, a green LED may be lit to signify ready status, and a yellow LED to indicate that a search is in progress. A positive search result is preferably indicated by a flashing green LED, and a red LED may indicate a negative result. In this manner, the user may distinguish which of many books 41 in bookshelf 22 contain a text string of interest.

Alternatively, indicators 44 may take any other convenient form, such as sound-producing elements.

For operational modes in which the user simultaneously accesses more than one interactive book, a protocol for coordinating data transfer proposed by the Shared Wireless Access Protocol (SWAP) Forum is preferably used, each interactive book 41 being considered a peripheral device of external computer 30. Information about the SWAP Forum can be found at http://www.homerf.org. When only one interactive book is being accessed, system 20 preferably employs a half-duplex, point-to-point protocol.

Figure 3A:
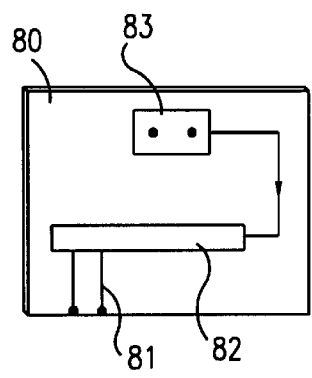
FIG. 3A is a schematic view of a power source for use with the device of FIG. 2, in accordance with a preferred embodiment of the present invention.
Figure 3B:
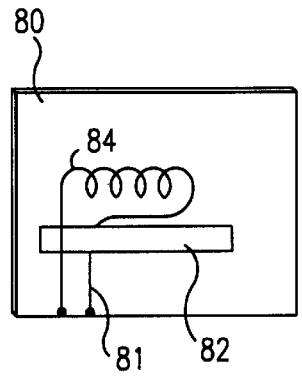
FIG. 3B is a schematic view of another power source for use with the device of FIG. 2, in accordance with a preferred embodiment of the present invention.
Figure 3C:
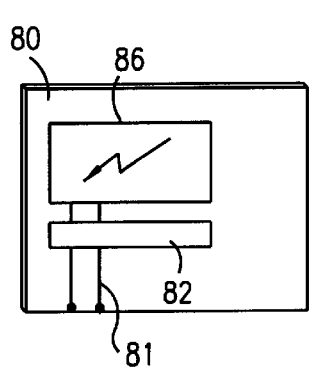
FIG. 3C is a schematic view of yet another power source for use with the device of FIG. 2, in accordance with a preferred embodiment of the present invention.

FIGS. 3A, 3B, and 3C are schematic illustrations of power source 80 in accordance with three alternative preferred embodiments of the present invention. FIG. 3A shows a battery 82, preferably rechargeable and/or replaceable, coupled to two leads 81 which carry current from the battery to the electrical components of electronic device 70. Battery 82 preferably comprises a lithium cell, which has a life-span of many years under normal use. Further preferably, processor 76 is able to detect a low-battery state of battery 82, and can convey this information to user 35 by, for example, flashing a yellow LED among indicators 44 on the spine of interactive book 41. The user can plug a battery charger into an optional charging socket 83, or can open electronic device 70 and replace battery 82. Preferably, if battery 82 is uncharged, electronic device 70 operates from power supplied through charging socket 83. In some modes of operation, for example during use of interactive book 41 in a library, processor 76 preferably is programmed to detect a low-battery state and to subsequently transmit an IR or RF "request for attention," accompanied by truncated bibliographic information about interactive book 41, in order to enable library personnel to maintain all interactive books fully charged.

In FIG. 3B, power source 80 includes an inductive coil 84, which can be used to receive power to charge battery 82 or to convey power directly to the electronic components of device 70. Coil 84 is inductively coupled to a transmitting coil (not shown), which may be located in bookshelf 22 or coupled to computer 30, for example. AC current in the transmitting coil induces a current to flow through coil 84, which is then rectified and used to power electronic device 70 and/or to charge the battery. Alternatively, all power to device 70 may be supplied through coil 84, either continuously or only when user 35 wishes to interact with books 41; and in this case, battery 82 may be dispensed with completely.

In FIG. 3C, a photoelectric cell 86 mounted on binding 47 of interactive book 41 is used to receive power to charge battery 82 or to convey power directly to the electronic components of device 70.

It will be appreciated that the preferred embodiments described above are cited by way of example, and the full scope of the invention is limited only by the claims.

We claim:

1. A device for storing data relating to a printed work containing information, comprising:
   an electronic memory, fixed to the printed work, in which at least a portion of the information in the printed work is stored, the portion including content of the printed work; and
   a communications port coupled to the memory, to enable a computer external to the printed work to access the information stored in the memory,
   wherein the communications port comprises a wireless communications link, and
   wherein the communications port is arranged to communicate with the external computer at substantially the same time as the external computer communicates with similar communications ports on other printed works.

2. A device according to claim 1, wherein the memory is fixed to a binding of the printed work.

3. A device according to claim 1, wherein the memory comprises a read-only memory.

4. A device according to claim 1, wherein the memory comprises a read-write memory, to which the external computer writes data via the communications port.

5. A device according to claim 4, wherein the data written by the external computer comprise a bookmark referring to a location in the memory specified by a user of the computer.

6. A device according to claim 1, and comprising a processor, which interacts with the memory in response to a command received via the communications port.

7. A device according to claim 6, wherein the processor searches the memory in accordance with instructions specified by a user of the external computer.

8. A device according to claim 6, wherein the processor transmits a selected portion of the information in the memory to the external computer via the communications port.

9. A device according to claim 6, and comprising an indicator coupled to the processor, which provides a sensible signal to a user of the external computer.

10. A device according to claim 9, wherein the indicator comprises a light-emitting element.

11. A device according to claim 1, wherein the wireless communications link comprises an infrared communication element.

12. A device according to claim 11, wherein the infrared communication element is mounted on a spine of the printed work.

13. A device according to claim 11, wherein the infrared communication element comprises an infrared transmitter and receiver, which communicate with a corresponding receiver and transmitter associated with the external computer.

14. A device according to claim 1, and comprising a battery fixed to the printed work, which provides power to operate the device.

15. A device according to claim 14, wherein the device detects a low-battery state of the battery and generates a low-battery signal responsive to the low-battery state, the low-battery signal comprising a wireless transmission through the communications port to a receiving unit external to the printed work.

16. A device according to claim 1, and comprising a photoelectric cell fixed to the printed work, which provides power to operate the device.

17. A device according to claim 1, and comprising an inductive element fixed to the printed work, which receives electromagnetic energy from a transmitter external to the printed work and converts the energy to an electrical current to operate the device.

18. Apparatus for storing and retrieving data relating to a printed work containing information, comprising:
   an electronic memory, fixed to the printed work, in which at least a portion of the information in the printed work is stored, the portion including content of the printed work; and
   a computer external to the printed work, which is arranged to access the information stored in the memory substantially simultaneously with communicating with similar memories fixed to other printed works.

19. Apparatus according to claim 18, and comprising a relay unit in communication with the external computer, wherein an instruction from the external computer is received by the relay unit and is relayed therefrom to a communications port associated with the electronic memory so as to access the information stored therein.

20. A method for electronically accessing information contained in a printed work, comprising:

storing at least a portion of the information in an electronic memory device, the portion including content of the printed work;

fixing the device to the printed work; and accessing the information stored in the memory device, wherein accessing the information comprises communicating substantially simultaneously with multiple electronic memory devices fixed to multiple, respective printed works.

21. A method according to claim 20, wherein storing the information comprises storing text information.

22. A method according to claim 20, and comprising storing in the memory device non-textual data relating to the information in the printed work.

23. A method according to claim 20, and comprising storing in the memory device bibliographic information relating to the printed work.

24. A method according to claim 20, wherein accessing the information comprises communicating with the device over a wireless link.

25. A method according to claim 24, wherein communicating with the device comprises sending and receiving infrared signals.

26. A method according to claim 20, and comprising generating a low-battery signal responsive to detecting a low-battery state of a battery coupled to the device, and transmitting the low-battery signal over a wireless link to a receiving device.

27. A method according to claim 20, wherein accessing the information comprises searching the memory device for a specified data string.

28. A method according to claim 27, and comprising signaling a user when the specified data string is found.

29. A method according to claim 28, wherein signaling the user comprises actuating a sensible indicator on a cover of the printed work.

30. A method according to claim 20, wherein accessing the information comprises writing data to the electronic memory device.

31. A method according to claim 30, wherein writing the data comprises recording a bookmark referring to a location in the memory device specified by a user of the computer.

32. A method for electronically accessing information regarding a plurality of printed works, to each of which an electronic device is fixed, each device including a memory in which the information is stored, the information including content of the respective printed work, and each device including a communications port coupled to the respective memory, the method comprising:

sending an instruction to each of the communications ports; and receiving responses substantially simultaneously from each of the ports regarding the respective printed works, based on the information in the respective memories.

33. A method according to claim 32, wherein sending the instruction comprises initiating a search of each respective memory for a specified data string.

34. A method according to claim 33, wherein receiving the responses comprises receiving a signal when the specified data string is found in one or more of the memories.

* * * * *